Feb. 10, 1925.
H. D. WILSON
1,526,105
PACKING STORAGE BATTERY SEPARATORS
Filed July 13, 1921
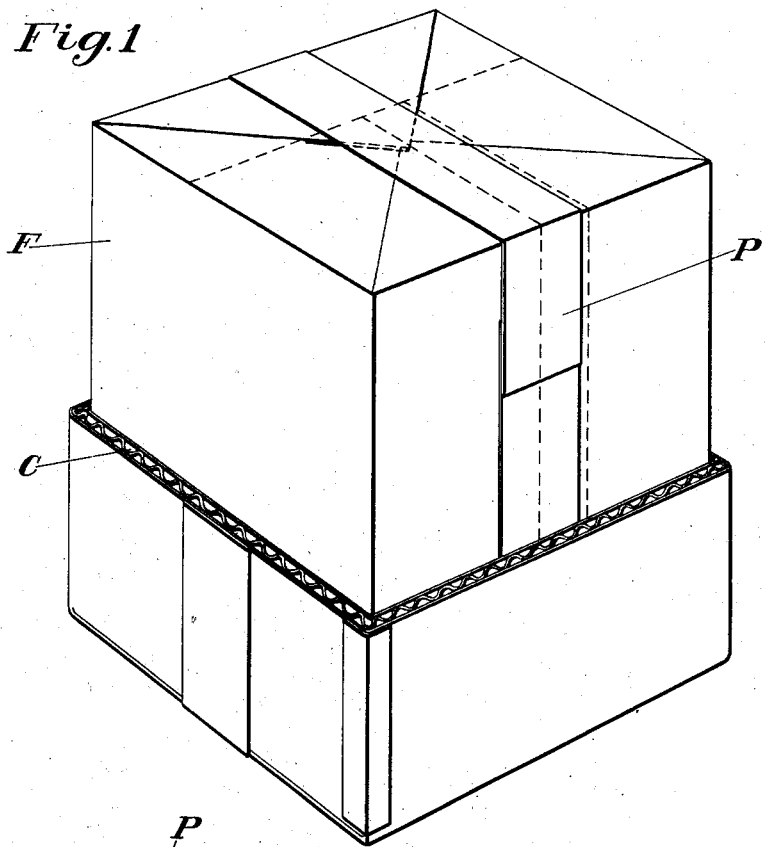
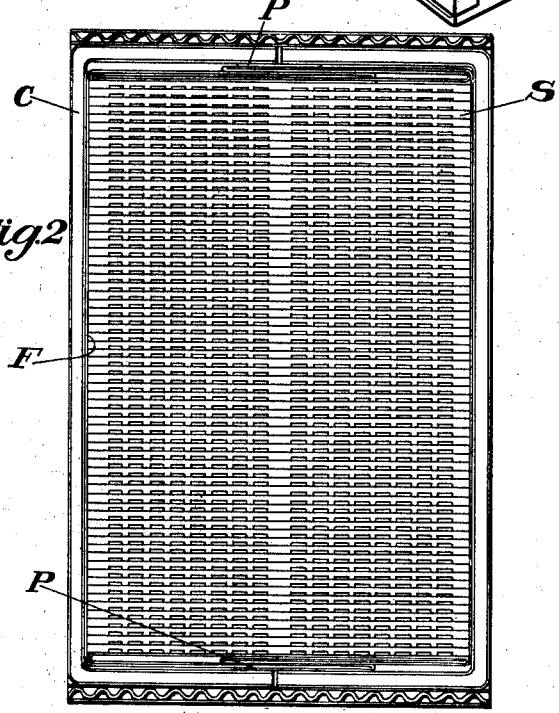
INVENTOR.
Harland D. Wilson
BY
ATTORNEYS.

Patented Feb. 10, 1925.

1,526,105

UNITED STATES PATENT OFFICE.

HARLAND D. WILSON, OF INDIANAPOLIS, INDIANA, ASSIGNOR TO THE PREST-O-LITE COMPANY, INC., A CORPORATION OF NEW YORK.

PACKING STORAGE-BATTERY SEPARATORS.

Application filed July 13, 1921. Serial No. 484,419.

*To all whom it may concern:*

Be it known that I, HARLAND D. WILSON, a citizen of the United States, residing at Indianapolis, in the county of Hendricks and State of Indiana, have invented certain new and useful Improvements in Packing Storage-Battery Separators, of which the following is a specification.

This invention relates to an improved method of packing storage battery separators and to an improved package of such separators.

In order to keep storage battery separators, especially wooden ones, from warping, splitting or otherwise becoming unfit for use during storage and shipment, it is desirable that they be kept in a wet condition and sterile. In packing wet treated wooden storage battery separators, it has been common practice to wrap them in some moisture-retaining material such as oiled or waxed paper, but under these conditions, probably because of the spores carried in the paper or floating about in the air, saprophytic fungi propagate and grow, destroying the wood structure and substantially reducing the quality of the separators for use in storage batteries.

I have discovered that moisture may be retained and the formation and growth of deleterious fungi may be practically prevented by wrapping the wet treated separators in metallic foils having fungicide properties. The improved results obtained are probably due to the fact that the metals of such foils chemically react with the moisture in the separators and the air in the package, spontaneously producing toxic chemical compounds or salts, such as the carbonates of these metals, which constitute fungicides opposing or preventing the formation and propagation of these fungous growths.

The objects and novel features of this invention will be apparent from the following description taken with the accompanying drawings in which—

Fig. 1 is a perspective view of a package of storage battery separators embodying this invention, parts of the outer carton being removed; and Fig. 2 is a central sectional view of the same.

The present invention is concerned principally with the prevention of drying and other deterioration of treated separators, the improvements being most advantageously applied to chemically treated wet wooden separators, but it will be understood that other types of either dry or wet separators partly of wood or having the characteristics of wood, and chemically treated or not, may also be wrapped or packed in the manner herein set forth to obtain beneficial results of the invention.

Before being packed, wooden separators are desirably treated, chemically or otherwise, to obtain a dilated separator structure of uniform size. After treatment of the separators, and desirably after the excess liquid such as water has run off, but while they are still saturated with liquid, and still sterile, the separators are put into a package and protected to prevent growth of fungi and evaporation of the moisture. According to this invention, the packing or wrapper for the separators comprises material which will oppose the growth of fungi, as by producing a suitable fungicide, and which is also impervious to air and moisture so that liquid will be retained in the body or pores of the separators. The separators may thus be indefinitely retained in a sterile moist condition ready for immediate use.

Referring to the drawing, S designates a stack of wet wooden storage battery separators which have been treated, chemically or otherwise, to dilate them and render them of substantially uniform properties for use in a storage battery. The particular type of separator is unimportant, the one shown being made of cedar, smooth on one face and grooved and ribbed on the opposite face. The separators may be assembled in a stack with the grooved side of one separator facing the smooth side of the adjacent separator. While the improvement is described in connection with ribbed wooden separators made of cedar, it will be understood that the invention is also applicable to other types of separator constructions and other kinds of wood or analogous material. The separators are desirably assembled in the stack and wrapped while they are saturated so that the moisture will be retained and the separators will remain in good condition indefinitely. The particular degree of wetness of the separators is unimportant.

According to the present invention, the stack of wet separators is enclosed in a wrapper of metallic foil F, which consists of a substantially rectangular sheet of foil, the thickness of which may vary. I have found a fairly thick foil to be best suited for the present purpose, the principal determining factors being the strength necessary, the facility with which it may be applied to the separators and the cost of the same. Metals such as lead, copper, zinc and tin, and foils of these metals, have been found satisfactory as wrapping materials for the purposes of this invention. Of these, lead foil is the most desirable because of the rapid formation of toxic substance on its inner surface, and the economy in cost, and the wrapper F shown is of this material. The size of the lead foil wrapper F is such that the edge portions thereof will overlap a considerable amount, about an inch in a package of standard size separators, the ends of the wrapper projecting beyond the top and bottom of the stack of separators a considerable distance so that they may be folded inwardly over the ends of the stack to completely enclose the latter, as shown. The foil wrapper may be readily folded and will be retained substantially as applied to the stack of separators but in order to more securely fasten the same and seal the joints, a strip of paper P is adhesively applied entirely around the package, over the lap joint of the foil wrapper and across both ends. Before applying the sealing strip P, the joints of the foil wrapper may be covered with sodium silicate, crude balsam or other suitable substance to more thoroughly seal the package. The foil wrapped separators are desirably enclosed in a protecting container, such as a corrugated paper carton C, which may be sealed and labeled.

While the lead and other metals, in the form of foils, most efficiently perform their functions as moisture-proof and fungicidal wrappers, satisfactory results may be obtained by enclosing separators in a moisture-proof wrapper of oiled or waxed paper containing fungicidal substance, such as lead or other metal foil, granulated lead or ready-prepared fungicide, such as lead carbonate; or moisture-proof paper or other sheet-material treated with a suitable fungicide, as by a coating of lead carbonate on its inner surface, may be employed as the wrapping material without departing from the scope of this invention or sacrificing its advantages.

I claim:

1. The method of packing storage battery separators that comprises enclosing such separators in a wrapper of fungicide-producing material adapted to oppose the growth of fungi.

2. The method of packing moist wooden storage battery separators that comprises enclosing such separators in a wrapper of material adapted to retain such separators in a moist condition and also containing a fungicide to oppose the growth of fungi therein.

3. The method of packing moist wooden storage battery separators for shipment and storage that comprises enclosing such separators in a wrapper which is impervious to air and which produces a chemical substance adapted to oppose the growth of fungi.

4. The method of packing moist wooden storage battery separators for shipment and storage that comprises enclosing such separators in a metallic foil wrapper having fungicide properties, and sealing the joints of such wrapper.

5. The method of packing storage battery separators that comprises wrapping such separators in metallic foil having fungicide properties.

6. The method of packing moist chemically-treated wooden storage battery separators that comprises enclosing such separators in a wrapper of lead foil.

7. A package of storage battery separators comprising a plurality of such separators enclosed in a wrapper containing fungicidal material adapted to oppose the growth of fungi.

8. A package of storage battery separators comprising a stack of moist wooden storage battery separators enclosed in a wrapper of material adapted to retain such separators in a moist condition and containing a fungicide to oppose the growth of fungi in said separators.

9. A package of storage battery separators comprising a stack of such separators enclosed in a wrapper of metallic foil having a fungicidal property.

10. A package of moist chemically-treated wooden storage battery separators comprising a stack of such separators enclosed in a wrapper of metallic foil having a fungicide-producing property.

11. A package of storage battery separators comprising a plurality of such separators enclosed in a wrapper of lead foil.

12. A package of storage battery separators containing a material adapted to spontaneously form a fungicide.

In testimony whereof I affix my signature.

HARLAND D. WILSON.